(12) United States Patent
Tokuda et al.

(10) Patent No.: US 6,190,801 B1
(45) Date of Patent: Feb. 20, 2001

(54) SEALED ALKALINE-ZINC STORAGE BATTERY

(75) Inventors: Mitsunori Tokuda, Osaka; Mutsumi Yano, Hirakata; Mitsuzou Nogami, Itano-gun; Shin Fujitani; Koji Nishio, both of Hirakata, all of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/274,808

(22) Filed: Mar. 23, 1999

(30) Foreign Application Priority Data

Mar. 24, 1998 (JP) .................................................. 10-096866
Feb. 15, 1999 (JP) .................................................. 11-036497

(51) Int. Cl.[7] .............................. H01M 4/42; H01M 4/52
(52) U.S. Cl. ......................... 429/231; 429/229; 429/223; 429/164
(58) Field of Search .................................. 429/223, 229, 429/164, 230, 231

(56) References Cited

U.S. PATENT DOCUMENTS

| | | | |
|---|---|---|---|
| 3,816,178 | * 6/1974 | Maki | 429/206 |
| 4,037,033 | * 7/1977 | Takamura | 429/206 |
| 4,041,221 | * 8/1977 | Berchielli | 429/206 |
| 4,332,871 | * 6/1982 | Charkey | 429/217 |
| 4,415,636 | * 11/1983 | Charkey | 429/27 |
| 5,466,543 | * 11/1995 | Ikoma | 429/59 |
| 5,773,176 | * 6/1998 | Serenyi | 429/231 |
| 5,780,186 | * 7/1998 | Casey, Jr. | 429/229 |
| 5,968,684 | * 10/1999 | Hayashi | 429/223 |
| 6,027,834 | * 2/2000 | Hayashi | 429/223 |

FOREIGN PATENT DOCUMENTS 50-2251   1/1975 (JP) .
62-1443368  6/1987 (JP) .

OTHER PUBLICATIONS

Kordesch, Karl V. *Batteries*; vol. 1 Manganese Dioxide (1974), pp. 256–259.

* cited by examiner

*Primary Examiner*—Stephen Kalafut
*Assistant Examiner*—Mark Ruthkosky
(74) *Attorney, Agent, or Firm*—Kubovcik & Kubovcik

(57) ABSTRACT

The invention provides a sealed alkaline-zinc storage battery including a tubular positive electrode containing, as an active material, a material having reversibility in a charge-discharge reaction; a separator; a negative electrode disposed within the tubular positive electrode with the separator sandwiched therebetween; and an alkaline electrolyte, in which the positive electrode has a capacity smaller than a capacity of the negative electrode at least in initial charge-discharge cycles, and the amounts of an uncharged active material and zinc to be packed in the negative electrode in manufacture of the sealed alkaline-zinc storage battery are set so that a theoretical capacity P of the uncharged active material existing in the negative electrode can be 0.3 through 1.8 times as large as a battery capacity in a completely charged state in the initial charge-discharge cycles, and that a theoretical capacity Q of zinc existing in the negative electrode can be 0.6 through 2.5 times as large as the battery capacity in a completely discharged state in the initial charge-discharge cycles. Thus, a sealed alkaline-zinc storage battery with high charge-discharge cycle performance is obtained.

12 Claims, 1 Drawing Sheet

SEALED ALKALINE-ZINC STORAGE BATTERY

BACKGROUND OF THE INVENTION

This application claims the priority of Japanese Patent Application Nos. 10-96866 filed on Mar. 24, 1998 and 11-36497/1999 filed on Feb. 15, 1999, which are incorporated herein by reference.

The present invention relates to a sealed alkaline-zinc storage battery comprising a tubular positive electrode, a separator, a negative electrode disposed within the tubular positive electrode with the separator sandwiched therebetween and an alkaline electrolyte, in which the positive electrode has a capacity smaller than a capacity of the negative electrode at least in initial charge-discharge cycles, namely, the battery capacity is controlled by the capacity of the positive electrode. More particularly, it relates to improvement of the negative electrode for the purpose of improving the charge-discharge cycle performance of such a battery.

A conventional sealed alkaline-zinc storage battery uses zinc as the negative electrode active material. Since zinc has a small electrochemical equivalent and has a base potential, an alkaline storage battery with a high energy density can be obtained by using zinc as the negative electrode active material. When zinc is used, dendrite (electrodeposited crystal with a branching treelike appearance) is grown during charge. When the dendrite is grown to penetrate through the separator, an internal short-circuit is caused. Accordingly, in order to avoid this problem, it is necessary to use a separator with a large mechanical strength, such as a laminated separator obtained by laminating plural separators, in a practical battery.

Sealed alkaline-zinc batteries are classified into, for example, a battery using a spiral electrode body obtained by winding a positive electrode and a negative electrode (zinc electrode) together with a separator sandwiched therebetween (hereinafter referred to as the "spiral type battery") and a battery using a cylindrical electrode body obtained by disposing a negative electrode within a cylindrical positive electrode with a separator sandwiched therebetween (hereinafter referred to as the "inside-out type battery").

The spiral type battery is disadvantageous in its high manufacturing cost because the structure of the spiral electrode body is complicated and a large amount of expensive separator such as a laminated separator is necessary. Also, since the spiral type battery uses a large amount of separator, the amount of an active material to be packed is unavoidably decreased. Accordingly, the spiral type battery has another disadvantage that the energy density is largely lowered due to the separator. Moreover, the spiral type battery adopts a system in which oxygen generated from the positive electrode during charge is absorbed by the negative electrode, but the oxygen cannot be smoothly absorbed by the negative electrode because the separator is disposed between the positive electrode and the negative electrode. Accordingly, the spiral type battery has still another disadvantage that the pressure within the battery can is so increased through repeated charge-discharge cycles that leakage can be easily caused.

On the other hand, the inside-out type battery is advantageous in its low cost because the structure of the cylindrical electrode body is simple and there is no need to use a large amount of expensive separator. Also, since there is no need to use a large amount of expensive separator, the energy density of the inside-out type battery is advantageously slightly lowered due to the separator. Moreover, it is possible to prevent oxygen from being generated from the positive electrode during charge by controlling the capacity of the zinc electrode to fall within a range where the charge-discharge reaction of the positive electrode (positive electrode active material) is reversible.

For example, Japanese Patent Publication No. 50-2251/1975 discloses an alkaline-zinc storage battery in which the capacity of the negative electrode is controlled to fall within a range where the charge-discharge reaction of a positive electrode mainly including manganese dioxide ($MnO_2$) is reversible. When manganese dioxide discharges 0.4 or more electrons per 1 mole, irreversible trimanganese tetraoxide ($Mn_3O_4$) is produced, which does not return to manganese dioxide by charge, and thus, the charge-discharge reaction of the positive electrode becomes irreversible. On the basis of this fact, the capacity ratio between the positive electrode and the negative electrode is controlled in this battery so that manganese dioxide cannot discharge 0.4 or more electrons.

Furthermore, Japanese Laid-Open Patent Publication No. 62-143368/1987 discloses an alkaline-zinc storage battery including 5 through 20 parts by weight of silver oxide based on 100 parts by weight of manganese dioxide used as the positive electrode active material. When this battery is charged at a constant voltage with the charge voltage set at a predetermined value or lower or is charged at a constant current with the charge termination voltage set at a predetermined value or lower, the generation of oxygen from the positive electrode during charge can be suppressed.

However, both the conventional alkaline-zinc storage batteries are batteries where the battery capacity is controlled by the capacity of the negative electrode, namely, the capacity of the positive electrode is larger than that of the negative electrode (hereinafter referred to as the "negative electrode control type" batteries). Therefore, these batteries have the problem that the battery capacity is largely lowered through repeated charge-discharge cycles. The battery capacity of a negative electrode control type battery is thus largely lowered for the following reason:

Formula (A) represents a charge-discharge reaction in an alkaline-zinc storage battery using manganese dioxide as the positive electrode active material. Formula (B) represents equilibrium of zinc. In Formulas (A) and (B), a rightward arrow indicates the charge reaction and a leftward arrow indicates the discharge reaction.

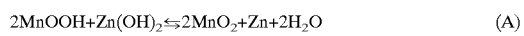  (A)

  (B)

As is shown in Formula (A), since water is produced in the charge reaction, the concentration of hydroxide ions is decreased by charge. When the concentration of hydroxide ions is decreased, the equilibrium represented by Formula (B) shifts leftward. Therefore, the solubility of zinc is decreased, and a charge failure can be easily caused, and hence, more hydrogen can be generated from the negative electrode. On the other hand, since water is consumed in the discharge reaction, the negative electrode can be easily passivated through repeated charge-discharge cycles. (Passivation is a phenomenon where discharge becomes difficult because the electrolyte is insufficiently supplied to the reaction site.) The decrease of water results in insufficient supply of the electrolyte to the reaction site. Such charge failure and passivation of the negative electrode in the alkaline-zinc storage battery do not bring a significant problem in the spiral type battery with a small depth of reaction in the negative electrode, but can be a main cause of degradation of the charge-discharge cycle performance in the inside-out type battery with a large depth of reaction in the negative electrode.

SUMMARY OF THE INVENTION

In view of the aforementioned conventional disadvantages and problems, an object of the invention is providing an inside-out type battery with high charge-discharge cycle performance.

The sealed alkaline-zinc storage battery of this invention comprises a tubular positive electrode including, as an active material, a material having reversibility in a charge-discharge reaction; a separator; a negative electrode disposed within the tubular positive electrode with the separator sandwiched therebetween; and an alkaline electrolyte, and the positive electrode has a capacity smaller than a capacity of the negative electrode at least in initial charge-discharge cycles, and the amounts of an uncharged active material and zinc to be packed in the negative electrode in manufacture of the sealed alkaline-zinc storage battery are set so that a theoretical capacity P of the uncharged active material existing in the negative electrode can be 0.3 through 1.8 times as large as a battery capacity in a completely charged state in the initial charge-discharge cycles, and that a theoretical capacity Q of zinc existing in the negative electrode can be 0.6 through 2.5 times as large as the battery capacity in a completely discharged state in the initial charge-discharge cycles.

In this manner, a sealed alkaline-zinc storage battery with high charge- discharge cycle performance can be obtained.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
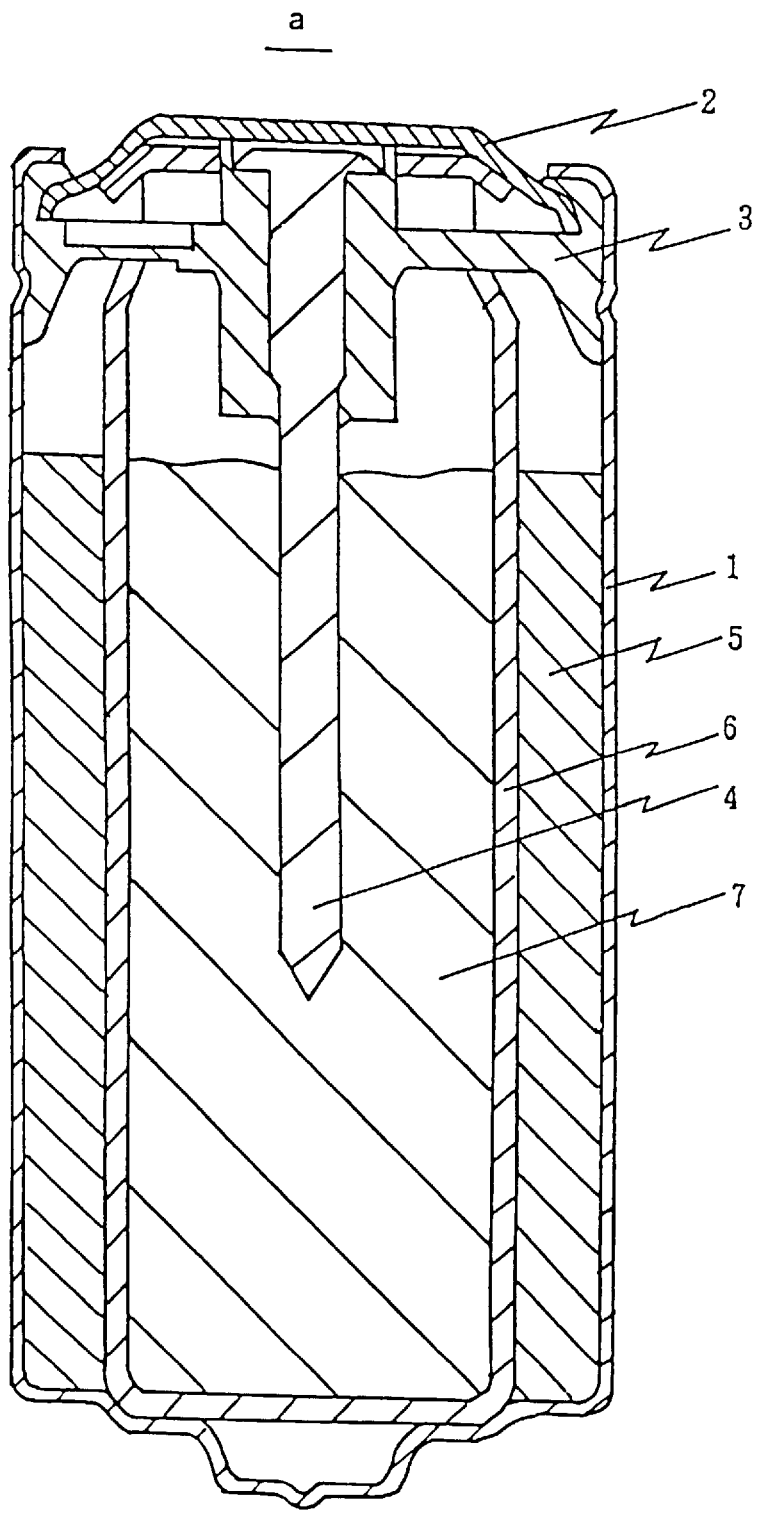
FIG. 1 is a sectional view of a sealed alkaline-zinc storage battery manufactured in an experiment of the invention.

A sealed alkaline-zinc storage battery according to the invention comprises a tubular positive electrode including, as an active material, a material having reversibility in a charge-discharge reaction; a separator; a negative electrode disposed within the tubular positive electrode with the separator sandwiched therebetween; and an alkaline electrolyte, and the positive electrode has a capacity smaller than a capacity of the negative electrode at least in initial charge-discharge cycles, and the amounts of an uncharged active material and zinc to be packed in the negative electrode in manufacture of the battery are set so that the theoretical capacity P of the uncharged active material existing in the negative electrode can be 0.3 through 1.8 times as large as a battery capacity in a completely charged state in the initial charge-discharge cycles, and that the theoretical capacity Q of zinc existing in the negative electrode can be 0.6 through 2.5 times as large as the battery capacity in a completely discharged state in the initial charge-discharge cycles.

The present battery is a battery in which the capacity of the positive electrode is smaller than that of the negative electrode at least in initial charge-discharge cycles, namely, the battery capacity is controlled by the capacity of the positive electrode (hereinafter referred to as the "positive electrode control type" battery). The restriction of "at least in initial charge-discharge cycles" is herein placed considering that the charge-discharge efficiency of an alkaline-zinc storage battery is 100% in initial charge-discharge cycles, and that since zinc is generally more easily degraded than a positive electrode active material, the capacity of the positive electrode can become larger than that of the negative electrode after repeating charge-discharge cycles even though the capacity of the positive electrode is smaller than that of the negative electrode in the initial charge-discharge cycles. A conventional sealed alkaline-zinc storage battery uses, as the positive electrode active material, $MnO_2$ which can suppress generation of oxygen from the positive electrode when the battery is charged with controlling the charge voltage for the positive electrode. Owing to the use of $MnO_2$, the conventional sealed alkaline-zinc storage battery unavoidably adopts capacity design of the negative electrode control type which requires a large amount of positive electrode active material for attaining a reversibly reactive electric capacity. However, by using, as the positive electrode active material, a material that has reversibility in the charge-discharge reaction and can suppress the generation of oxygen by controlling the charge potential for the positive electrode, the generation of oxygen from the positive electrode during charge can be prevented even when capacity design of the positive electrode control type is adopted as in this invention.

An example of the material that has reversibility in the charge-discharge reaction and can suppress the generation of oxygen by controlling the charge potential for the positive electrode includes a hydroxide of nickel including, as a solid-solution element, manganese (Mn), which has an α-Ni $(OH)_2$ crystal structure in a discharged state and has a γ-NiOOH crystal structure in a charged state. The α-Ni $(OH)_2$ in a discharged state has excellent features that oxygen overpotential (oxygen generation potential-charge potential) is high and that it can be charged without a side reaction. The α-Ni$(OH)_2$ can be obtained by adding manganese as a solid-solution element. Manganese dioxide used as a positive electrode active material for an alkaline dry battery cannot be used as the positive electrode active material for a storage battery because it has so poor reversibility in the charge-discharge reaction that it cannot completely return to original manganese dioxide by charge after the first discharge. A hydroxide of nickel in which manganese (Mn) and at least one element selected from the group consisting of aluminum (Al), cobalt (Co), yttrium (Y), ytterbium (Yb), erbium (Er) and gadolinium (Gd) are added as solid-solution elements can be used. The oxygen overpotential of the positive electrode active material can be further increased by adding, as the solid-solution elements, any of these elements in addition to manganese. The hydroxide of nickel preferably has a valence of nickel of 3.4 through 3.8 in a completely charged state. When the hydroxide of nickel has a valence of nickel smaller than 3.4, a sufficient battery capacity is difficult to obtain. No hydroxide of nickel has a valence of nickel exceeding 3.8 in the completely charged state. The negative electrode can include an additive for increasing hydrogen overpotential (a material having large hydrogen overpotential) in order to suppress the generation of a hydrogen gas during storage. Examples of the additive include indium (In), bismuth (Bi), tin (Sn), gallium (Ga), diindium trioxide ($In_2O_3$), dibismuth trioxide ($Bi_2O_3$), tin oxide (SnO) and digallium trioxide ($Ga_2O_3$). One of these additives can be singly used or a combination of two or more of them can be used if necessary. An example of the alkaline electrolyte to be used includes an aqueous solution including at least one alkali selected from the group consisting of potassium hydroxide, sodium hydroxide and lithium hydroxide. An aqueous solution of potassium hydroxide is preferred. The present invention is particularly significant in application to a sealed alkaline-zinc storage battery of a high density packing type in which an energy generating unit consisting of a positive electrode, a negative electrode, an alkaline electrolyte, a separator and a negative current collector occupies 75% by volume or more of the content volume inside of an insulating packing of the battery can.

The theoretical capacity P of the uncharged active material existing in the negative electrode in the completely charged state in the initial charge-discharge cycles is herein specified to be 0.3 through 1.8 times as large as the battery capacity for the following reason: When the theoretical capacity P is smaller than a 0.3-fold capacity, the battery capacity is controlled by the capacity of the negative electrode, and hence, the battery capacity is lowered. When the theoretical capacity P exceeds a 1.8-fold capacity, the electronic conductivity of the negative electrode is lowered by the excessive uncharged active material, and the ionic conductivity is lowered due to decrease of the supply amount of the electrolyte. As a result, the utilization of zinc during discharge is decreased. Specific examples of the uncharged active material include zinc hydroxide ($Zn(OH)_2$) and zinc oxide (ZnO), among which zinc hydroxide is preferred. When zinc hydroxide is used, the amount of water molecules within the battery system is so increased that zinc is difficult to passivate during discharge. Therefore, the charge-discharge cycle performance can be improved as compared with the case where zinc oxide is used. The theoretical capacity Q of zinc existing in the negative electrode in the completely discharged state in the initial charge-discharge cycles is herein specified to be 0.6 through 2.5 times as large as the battery capacity for the following reason: When the theoretical capacity Q is smaller than a 0.6-fold capacity, the battery capacity is controlled by the capacity of the negative electrode, and hence, the battery capacity is lowered. When the theoretical capacity Q exceeds a 2.5-fold capacity, the ionic conductivity is decreased due to the decrease of the supply amount of the electrolyte, resulting in decreasing the utilization of zinc during discharge. The preferable ranges of the theoretical capacity P of the uncharged active material existing in the completely charged state and the theoretical capacity Q of zinc existing in the completely discharged state are universal regardless of the shape and the capacity of a battery. The shapes of the positive electrode and the negative electrode are not herein specified. However, since the negative electrode is disposed within the tubular positive electrode, it is preferred that the positive electrode has a circular cylindrical shape and the negative electrode has a circular cylindrical or columnar shape. This is because a distance between the opposing positive and negative electrodes with the separator sandwiched therebetween can be thus made constant over the entire lengths of the positive and negative electrodes.

As described above, the amounts of the uncharged active material and zinc to be packed in the negative electrode are appropriately set in the present battery, and hence, zinc is difficult to degrade through charge-discharge cycles.

Other features of the invention will become more apparent in the course of the following descriptions of exemplary embodiments which are given for illustration of the invention and not intended to be limiting thereof.

Experiment 1

In this experiment, the relationship between the theoretical capacity P of an uncharged active material existing in a negative electrode in a completely charged state in initial charge-discharge cycles and the charge-discharge cycle performance was examined.

Preparation of Positive Electrode

A 10 wt % aqueous solution of ammonia and a 10 wt % aqueous solution of sodium hydroxide were added dropwise to 1 liter of an aqueous solution including 0.2 mole of nickel sulfate and 0.1 mole of manganese sulfate, so as to adjust the resultant solution to pH 10.0±0.4 with a precipitate produced. The precipitate was filtered to be immersed in a 20 wt % aqueous solution of potassium hydroxide at room temperature for 1 week. The supernatant was removed, and the residue was washed with a large amount of water, filtered and dried. Thus, a positive electrode active material was prepared. It was confirmed by X-ray diffraction and electron probe microanalyser (EPMA) that the positive electrode active material was a solid-solution with the $\alpha$-$Ni(OH)_2$ crystal structure including $\alpha$-$Ni(OH)_2$ and Mn. Subsequently, 90 parts by weight of the positive electrode active material, 10 parts by weight of graphite and 10 parts by weight of water were mixed over 30 minutes, and the resultant mixture was compressedly molded into a positive electrode in a cylindrical shape with an outer diameter of 13.3 mm, an inner diameter of 10.3 mm and a height of 12 mm. In manufacturing a battery in this experiment, three positive electrodes thus obtained were longitudinally stacked to be used as one tubular positive electrode.

Preparation of Negative Electrodes

To mixtures including zinc (Zn) and zinc oxide (ZnO) in various ratios, diindium trioxide ($In_2O_3$), carboxymethyl cellulose (CMC), polytetrafluoroethylene (PTFE) and water were added. Each of the resultant mixtures was kneaded to give a paste. The paste was applied and adhered under pressure onto an outer circumferential surface of a negative current collector (with a diameter of 2.5 mm) of copper plated with indium. Thus, a negative electrode in a columnar shape with a height of 38 mm was obtained. The proportions of diindium trioxide, CMC and PTFE to the total amount of zinc, zinc oxide, diindium trioxide, CMC and PTFE were 2.5% by weight, 1.0% by weight and 0.5% by weight, respectively. Also, the proportion of water to the total amount of zinc and zinc oxide was approximately 20% by weight.

Manufacture of Batteries

Inside-out type sealed alkaline-zinc storage batteries A11 through A16 (present batteries) and B11 and B12 (comparative batteries) were manufactured by using the aforementioned positive and negative electrodes. A 40 wt % aqueous solution of potassium hydroxide was used as the electrolyte, which was supplied to each battery until the positive and negative electrodes were completely impregnated. Table 1 below lists the amounts of zinc, zinc oxide and the electrolyte used in each battery; a multiplying factor, against the battery capacity, of the theoretical capacity P of the uncharged active material existing in the negative electrode in the completely charged state in the initial charge-discharge cycles (shown as the multiplying factor of P); and a multiplying factor, against the battery capacity, of the theoretical capacity Q of zinc existing in the negative electrode in the completely discharged state in the initial charge-discharge cycles (shown as the multiplying factor of Q). The method of calculating the multiplying factors of P and Q will now be described by exemplifying the present battery A13.

Calculation of Multiplying Factor of P

The uncharged active material existing in the negative electrode in the completely charged state in the initial charge-discharge cycles corresponds to zinc oxide that has not been charged. Since the present battery is a battery whose battery capacity is controlled by the capacity of the positive electrode, the battery capacity in the initial charge-discharge cycles is 1 Ah, corresponding to the capacity of the positive electrode active material. The theoretical capacity of zinc oxide is 0.658 Ah/g, and hence, the capacity of zinc oxide packed in the preparation of the electrode is 1.64 Ah (=0.658 Ah/g×2.5 g). Therefore, the theoretical capacity P of the uncharged active material existing in the negative electrode in the completely charged state in the initial charge-discharge cycles is 0.64 Ah (=1.64 Ah−1 Ah). Accordingly, the multiplying factor of P (i.e., the theoretical capacity P of the uncharged active material/the battery capacity) is approximately 0.6 (=0.64 Ah/1 Ah) when rounded to one decimal.

Calculation of Multiplying Factor of Q

In discharge in the initial charge-discharge cycles, the capacity to be discharged corresponds to the capacity of zinc produced by charging zinc oxide, that is, 1 Ah. Accordingly, the amount of zinc existing in the negative electrode in the completely discharged state in the initial charge-discharge cycles is equal to the amount of zinc packed in the preparation of the electrode. The theoretical capacity of zinc is 0.820 Ah/g, and hence, the theoretical capacity Q of zinc existing in the negative electrode in the completely discharged state in the initial charge-discharge cycles is 1.23 Ah (=0.820 Ah/g×1.5 g). Accordingly, the multiplying factor of Q (i.e., the theoretical capacity Q of undischarged zinc/the battery capacity) is approximately 1.2 (=1.23 Ah1 Ah) when rounded to one decimal.

The tubular positive electrode 5 is housed in the positive electrode can 1 with the outer circumferential surface of the positive electrode 5 in contact with the inner circumferential surface of the positive electrode can 1. The laminated separator 6 is in contact with and pressed against the inner circumferential surface of the positive electrode 5. The columnar negative electrode 7 is in contact with and pressed against the inner circumferential surface of the laminated separator 6. Through the columnar negative electrode 7, the negative current collector 4 is inserted with its one end supported by the insulating packing 3 for electrically insulating the positive electrode can 1 from the negative electrode can 2. The opening of the positive electrode can 1 is covered with the negative electrode can 2. The battery is sealed by filling the opening of the positive electrode can 1 with the insulating packing 3, placing the negative electrode can 2 thereon, and caulking the edge of the opening of the positive electrode can 1 inward.

Discharge Capacities in First and 10th Cycles of Each Battery

With regard to each of the eight kinds of sealed alkaline-zinc storage batteries of Table 1 different from one another in the negative electrodes alone, 10 charge-discharge cycles were run, in each cycle of which the battery was charged with a current of 100 mA to 1.95 V and discharged with a current of 100 mA to 1.0 V. Thus, the discharge capacities in the first and 10th cycles of each battery were obtained. The results are shown in Table 1 above. It was confirmed that the positive electrode active material used in this experiment, namely, the solid solution of α-Ni(OH)$_2$ and Mn, was changed into a material having the γ-NiOOH crystal structure through charge, and had reversibility in the charge-discharge reaction with no oxygen generated from the positive electrode during charge.

TABLE 1

|  | Zn (g) | ZnO (g) | Electrolyte (g) | Multiplying factor of P | Multiplying factor of Q | Discharge capacity in 1st cycle (mAh) | Discharge capacity in 10th cycle (mAh) |
|---|---|---|---|---|---|---|---|
| Comparative battery B11 | 1.5 | 1.6 | 3.4 | 0.1 | 1.2 | 900 | 770 |
| Present battery A11 | 1.5 | 1.9 | 3.0 | 0.3 | 1.2 | 1000 | 980 |
| Present battery A12 | 1.5 | 2.0 | 2.9 | 0.3 | 1.2 | 1010 | 990 |
| Present battery A13 | 1.5 | 2.5 | 2.5 | 0.6 | 1.2 | 1020 | 990 |
| Present battery A14 | 1.5 | 3.0 | 2.3 | 1.0 | 1.2 | 1040 | 1000 |
| Present battery A15 | 1.5 | 3.5 | 2.1 | 1.3 | 1.2 | 1050 | 1010 |
| Present battery A16 | 1.5 | 4.2 | 1.8 | 1.8 | 1.2 | 1020 | 1000 |
| Comparative battery B12 | 1.5 | 4.5 | 1.7 | 2.0 | 1.2 | 950 | 770 |

FIG. 1 is a sectional view of the inside-out type battery thus manufactured. The inside-out type battery a of FIG. 1 comprises a bottomed cylindrical positive electrode can (positive electrode external terminal) 1, a negative electrode can (negative electrode external terminal) 2, an insulating packing 3, a negative current collector 4, a tubular positive electrode (nickel electrode) 5, a bottomed cylindrical laminated separator 6 obtained by laminating cellophane and vinylon nonwoven fabric, and a columnar negative electrode (zinc electrode) 7.

As is shown in Table 1, the discharge capacities of the present batteries A11 through A16 are not largely decreased in the 10th cycle, while the discharge capacities of the comparative batteries B11 and B12 are largely decreased in the 10th cycle. This means that an inside-out type battery with high charge-discharge cycle performance can be obtained by setting the amounts of the uncharged active material and zinc to be packed in the negative electrode in the manufacture of the battery so that the theoretical capacity P of the uncharged active material existing in the negative electrode in the completely charged state in the initial charge-discharge cycles (for example, in the first cycle) can be 0.3 through 1.8 times as large as the battery capacity.

Experiment 2

In this experiment, the relationship between the theoretical capacity Q of zinc existing in a negative electrode in a completely discharged state in initial charge-discharge cycles and the charge-discharge cycle performance was examined.

Present batteries A21 through A25 and comparative batteries B21 and B22 were manufactured in the same manner as in Experiment 1 except that the amounts of zinc and zinc oxide to be used in the negative electrodes and the amount of the electrolyte (a 40 wt % aqueous solution of potassium hydroxide) were set as shown in Table 2. Table 2 below lists the amounts of zinc, zinc oxide and the electrolyte used in each battery; a multiplying factor, against the battery capacity, of the theoretical capacity P of the uncharged active material existing in the negative electrode in the completely charged state in the initial charge-discharge cycles (shown as the multiplying factor of P); and a multiplying factor of the theoretical capacity Q, against the battery capacity, of zinc existing in the negative electrode in the completely discharged state in the initial charge-discharge cycles (shown as the multiplying factor of Q). Subsequently, the charge-discharge cycle test was conducted under the same conditions as in Experiment 1, thereby obtaining the discharge capacities in the first cycle and the 10th cycle of each battery. The results are shown in Table 2. Table 2 also lists the result obtained in the present battery A13 shown in Table 1.

As is shown in Table 2, the discharge capacities of the present batteries A21 through A25 are not largely decreased in the 10th cycle, while the discharge capacities of the comparative batteries B21 and B22 are largely decreased in the 10th cycle. This means that an inside-out type battery with high charge-discharge cycle performance can be obtained by setting the amounts of the uncharged active material and zinc to be packed in the negative electrode in the manufacture of the battery so that the theoretical capacity Q of zinc existing in the negative electrode in the completely discharged state in the initial charge-discharge cycles can be 0.6 through 2.5 times as large as the battery capacity.

Experiment 3

In this experiment, the relationship between the kind of an uncharged active material and the charge-discharge cycle performance was examined.

Present batteries A31 through A34 were manufactured in the same manner as that adopted for the present battery A13 in Experiment 1 except that zinc oxide was replaced with a mixture of zinc oxide and zinc hydroxide ($Zn(OH)_2$) or zinc hydroxide. Table 3 below lists the amounts of zinc, zinc oxide, zinc hydroxide and the electrolyte used in each battery; a multiplying factor, against the battery capacity, of the theoretical capacity P of the uncharged active material existing in the negative electrode in the completely charged state in the initial charge-discharge cycles (shown as the multiplying factor of P); and a multiplying factor, against the battery capacity, of the theoretical capacity Q of zinc existing in the negative electrode in the completely discharged state in the initial charge-discharge cycles (shown as the multiplying factor of Q). Subsequently, the charge-discharge cycle test was conducted under the same conditions as in Experiment 1, thereby obtaining the discharge capacities in the first cycle and the 10th cycle of each battery. The results are shown in Table 3. Table 3 also lists the result obtained in the present battery A13 shown in Table 1.

TABLE 2

|  | Zn (g) | ZnO (g) | Electrolyte (g) | Multiplying factor of P | Multiplying factor of Q | Discharge capacity in 1st cycle (mAh) | Discharge capacity in 10th cycle (mAh) |
|---|---|---|---|---|---|---|---|
| Comparative battery B21 | 0.5 | 2.5 | 3.5 | 0.6 | 0.4 | 800 | 750 |
| Present battery A21 | 0.7 | 2.5 | 3.3 | 0.6 | 0.6 | 990 | 960 |
| Present battery A22 | 1.0 | 2.5 | 2.9 | 0.6 | 0.8 | 1010 | 990 |
| Present battery A13 | 1.5 | 2.5 | 2.5 | 0.6 | 1.2 | 1020 | 990 |
| Present battery A23 | 2.0 | 2.5 | 2.3 | 0.6 | 1.6 | 1030 | 1000 |
| Present battery A24 | 2.5 | 2.5 | 2.1 | 0.6 | 2.1 | 1020 | 990 |
| Present battery A25 | 3.1 | 2.5 | 1.9 | 0.6 | 2.5 | 1000 | 960 |
| Comparative battery B22 | 3.5 | 2.5 | 1.7 | 0.6 | 2.9 | 910 | 670 |

TABLE 3

|  | Zn (g) | ZnO (g) | $Zn(OH)_2$ (g) | Electrolyte (g) | Multiplying factor of P | Multiplying factor of Q | Discharge capacity in 1st cycle (mAh) | Discharge capacity in 10th cycle (mAh) |
|---|---|---|---|---|---|---|---|---|
| Battery A13 | 1.5 | 2.5 | 0 | 2.5 | 0.6 | 1.2 | 1020 | 990 |

TABLE 3-continued

|  | Zn (g) | ZnO (g) | Zn(OH)$_2$ (g) | Electrolyte (g) | Multiplying factor of P | Multiplying factor of Q | Discharge capacity in 1st cycle (mAh) | Discharge capacity in 10th cycle (mAh) |
|---|---|---|---|---|---|---|---|---|
| Battery A31 | 1.5 | 1.5 | 1.0 | 2.5 | 0.6 | 1.2 | 1020 | 1000 |
| Battery A32 | 1.5 | 1.0 | 1.5 | 2.5 | 0.6 | 1.2 | 1020 | 1000 |
| Battery A33 | 1.5 | 0.5 | 2.0 | 2.5 | 0.6 | 1.2 | 1020 | 1010 |
| Battery A34 | 1.5 | 0 | 2.5 | 2.5 | 0.6 | 1.2 | 1030 | 1020 |

It is obvious from Table 3 that zinc hydroxide is preferred as the uncharged active material to be used in the preparation of the negative electrode. The discharge capacity in the first cycle of the present battery A34 is slightly larger than the discharge capacities in the first cycle of the present batteries A13 and A31 through A33 because the amount of the water molecules within the battery system of the battery A34 is slightly increased, and hence, the utilization of the positive electrode is slightly improved.

In the above-described experiments, the description is given on an inside-out type battery which needs charge before use. However, the present invention is applicable to an inside-out type battery which does not need charge before use.

Obviously, numerous modifications and variations of the present invention are possible in light of the above teachings. It is therefore to be understood that within the scope of the appended claims the invention may be practiced otherwise than as specifically described herein.

What is claimed is:

1. A sealed alkaline-zinc storage battery comprising a tubular positive electrode including, as an active material, a material having reversibility in a charge-discharge reaction; a separator; a negative electrode disposed within the tubular positive electrode with the separator sandwiched therebetween; and an alkaline electrolyte, in which the positive electrode has a capacity smaller than a capacity of the negative electrode at least in initial charge-discharge cycles, amounts of an uncharged active material and zinc to be packed in the negative electrode in manufacture of the sealed alkaline-zinc storage battery being set so that a theoretical capacity P of the uncharged active material existing in the negative electrode is 0.3 through 1.8 times as large as a battery capacity in a completely charged state in the initial charge-discharge cycles, and that a theoretical capacity Q of zinc existing in the negative electrode is 0.6 through 2.5 times as large as the battery capacity in a completely discharged state in the initial charge-discharge cycles.

2. The sealed alkaline-zinc storage battery according to claim 1,
wherein the uncharged active material to be included in the negative electrode in the manufacture of the sealed alkaline-zinc storage battery is zinc hydroxide.

3. The sealed alkaline-zinc storage battery according to claim 1,
wherein the material having reversibility in a charge-discharge reaction is a material having a γ-NiOOH crystal structure in a charged state.

4. The sealed alkaline-zinc storage battery according to claim 1,
wherein the positive electrode has a cylindrical shape and the negative electrode has a cylindrical or columnar shape.

5. The sealed alkaline-zinc storage battery according to claim 1,
wherein the material having reversibility in a charge-discharge reaction is a hydroxide of nickel in which manganese (Mn) is added as a solid-solution element.

6. The sealed alkaline-zinc storage battery according to claim 1,
wherein the material having reversibility in a charge-discharge reaction is a hydroxide of nickel in which manganese (Mn) and at least one element selected from the group consisting of aluminum (Al), cobalt (Co), yttrium (Y), ytterbium (Yb), erbium (Er) and gadolinium (Gd) are added as solid-solution elements.

7. The sealed alkaline-zinc storage battery according to claim 1,
wherein the material having reversibility in a charge-discharge reaction is a hydroxide of nickel having a valence of nickel of 3.4 through 3.8 in a completely charged state.

8. The sealed alkaline-zinc storage battery according to claim 1,
wherein the negative electrode includes an additive for increasing hydrogen overpotential.

9. The sealed alkaline-zinc storage battery according to claim 8,
wherein the additive for increasing hydrogen overpotential is at least one material selected from the group consisting of indium (In), bismuth (Bi), tin (Sn), gallium (Ga), diindium trioxide (In$_2$O$_3$), dibismuth trioxide (Bi$_2$O$_3$), tin oxide (SnO) and digallium trioxide (Ga$_2$O$_3$).

10. The sealed alkaline-zinc storage battery according to claim 1,
wherein the alkaline electrolyte is an aqueous solution including at least one alkali selected from the group consisting of potassium hydroxide, sodium hydroxide and lithium hydroxide.

11. The sealed alkaline-zinc storage battery according to claim 1,
wherein the alkaline electrolyte is an aqueous solution of potassium hydroxide.

12. The sealed alkaline-zinc storage battery according to claim 1,
wherein an energy generating unit including the positive electrode, the negative electrode, the alkaline electrolyte, the separator and a negative current collector occupies 75% by volume or more of a content volume inside of the insulating packing of a battery can.

* * * * *